United States Patent [19]

Kloots et al.

[11] Patent Number: 4,616,257
[45] Date of Patent: Oct. 7, 1986

[54] HEADLIGHT

[75] Inventors: Jacobus Kloots, Sturbridge; Frans G. Van Der Bel, Southbridge, both of Mass.

[73] Assignee: Luxtec Corporation, Sturbridge, Mass.

[21] Appl. No.: 744,801

[22] Filed: Jun. 13, 1985

[51] Int. Cl.⁴ .............................................. H04N 7/18
[52] U.S. Cl. ....................................... 358/93; 358/88; 358/108; 362/32; 362/105; 362/253; 362/268; 362/285; 362/371; 362/419; 362/804
[58] Field of Search ................. 362/32, 105, 106, 253, 362/268, 285, 296, 371, 419, 804; 128/23; 353/29; 250/227, 578; 358/88, 93, 108

[56] References Cited

U.S. PATENT DOCUMENTS

| 2,651,301 | 9/1953 | Allyn . |
| 3,645,254 | 2/1972 | Burton . |
| 3,664,330 | 5/1972 | Deutsch . |
| 3,699,950 | 10/1972 | Humphrey . |
| 3,745,993 | 7/1973 | Feinbloom . |
| 3,830,230 | 8/1974 | Chester . |
| 3,851,642 | 12/1974 | McDonald . |
| 3,951,139 | 4/1976 | Kloots . |
| 4,051,534 | 9/1977 | Dukich et al. ................. 358/93 X |
| 4,052,980 | 10/1977 | Grams . |
| 4,090,506 | 5/1978 | Pilgrim . |
| 4,102,333 | 7/1978 | Storz . |
| 4,266,534 | 5/1981 | Ogawa . |
| 4,274,128 | 6/1981 | Malis . |
| 4,290,422 | 9/1981 | Burton . |
| 4,395,731 | 7/1983 | Schoolman ...................... 358/88 |
| 4,398,799 | 8/1983 | Swift ............................. 358/93 X |
| 4,495,949 | 1/1985 | Stoller . |
| 4,502,468 | 3/1985 | Burgin . |
| 4,516,157 | 5/1985 | Campbell ....................... 358/108 |
| 4,516,190 | 5/1985 | Kloots . |

Primary Examiner—Randall L. Green
Attorney, Agent, or Firm—Blodgett & Blodgett

[57] ABSTRACT

Head-mounted illuminating apparatus, including a visual image pickup means and an audio pickup means for transmittal to a remote station.

8 Claims, 10 Drawing Figures

BOTTOM VIEW

TOP VIEW

R.H. SIDE VIEW

L.H. SIDE VIEW

BACK VIEW

FRONT VIEW and# HEADLIGHT

BACKGROUND OF THE INVENTION

For many years, the need for a physician and other type of worker to illuminate his work area (where fine work is to be done) has been supplied by the use of a concave mirror with a central axis aperture for the physician to look through. At times the normal room light has been supplemented by a high-intensity incandescent light associated with the mirror. With the advent of fibre-optics, it has been common practice to bring the light down to the desired work area by use of a fibre-optic cable that is attached to the head band of the apparatus. It has recently became more and more important that the image of the work area be made available for observation by students and for keeping a record of the operation. Since the surgeon's head blocks any view from behind him, a television camera or movie camera necessarily had to operate from the side and, of course, could not possibly see the same image as the surgeon. With many situations (where the operation is taking place deep within a body cavity, for instance) a television camera located at the side does not see any of the manipulation involved in the operation. It has been suggested that a television or movie camera be attached to the headband adjacent the illuminating means, but the suggested constructions for doing this involved a number of problems. First of all, having both the illumination and the camera directed at the work area is a problem, since the work area can change in various respects. Furthermore, the width of conventional equipment means that a large object must be inserted between the surgeons eyes, so that he has to move his head around to observe his work area. Often only one eye at a time would be able to look at the operation site. Furthermore, it would be desirable if, during the operation, the surgeon were not only able to send a picture to a remote station of the operation in color, but also to describe verbally what is happening. Not only could this be used for instruction purposes, but also for making a record of the operation for use in a possible malpractice suit or the like. These and other difficulties experienced with the prior art devices have been obviated in a novel manner by the present invention.

It is, therefore, an outstanding object of the invention to provide a headlight capable of not only illuminating the work area, but also transmitting a video image and an audio signal to a remote location for use in instruction and recording.

Another object of this invention is the provision of a headlight for surgeons in which a visual image and sound transmittal takes place without the need for attention by the surgeon.

A further object of the present invention is the provision of a headlight including a combination illumination, T.V. transmittal, and audio transmittal apparatus, in which the surgeon only need adjust the illuminating means and the other functions perform automatically.

It is another object of the instant invention to provide a medical headlight in which illuminating means and image transmittal means are arranged so that they do not block the surgeon's view.

A still further object of the invention is the provision of a surgical headlight which is simple in construction, which is economical to manufacture, and which is capable of a long life of useful service with a minimum of maintenance.

It is a further object of the invention to provide a headlight in which the illumination source, image transmission, and audio transmission are combined in apparatus which is relatively narrow, so that vision is not obstructed when the apparatus is located between the eyes.

It is a still further object of the present invention to provide a headlight in which the illumination area and the image pickup area remain coextensive despite substantial adjustments relative to the headband.

With these and other objects in view, as will be apparent to those skilled in the art, the invention resides in the combination of parts set forth in the specification and covered by the claims appended hereto.

SUMMARY OF THE INVENTION

In general, the invention consists of a headlight having a headband adapted to fit snugly on a human head above the eyes and a main housing with an illuminating lense and a viewing lense extending from a narrow surface of the main housing. The viewing lense includes an integrated circuit chip acting as a light-to-electrical signal transducer. The set of lines of the lenses lie in a vertical plane that is midway between the users eyes and intersect at a substantial distance from the said surface. A bracket holds the housing in the general level of the eyes of the user and midway between the eyes, the bracket permitting adjustment of the housing relative to the eyes. The adjustment permitted consists of distance, level, and angle in the vertical plane. A light source fibre-optic cable extends from the top of the housing and is connected to the illuminating lense. A communication cable which is connected to the viewing chip and which also extends from the top of the housing transmits an image to a viewing screen that is substantially the same as the image seen by the eyes. A microphone is mounted in the lower part of the housing.

Specifically, the illuminating lense generates a light beam of sufficient diameter that it is intersected by the centerline of the viewing lense over a wide range of distances from the housing surface. The centerline of the viewing lense is located midway between the eyes of the user and is located on a level therewith, so that the image picked up is exactly the same as the image seen by the eyes. The diameter of the two lenses and the thickness of the housing is very small, so that neither housing nor lenses interferes with the users line-of-sight. The bracket consists of a link that is pivotally attached to the rear of the main housing to provide a horizontal pivotal axis that is midway between the centerlines of the two lenses; because of this arrangement, angular adjustment can take place with a minimum of change in vertical and horizontal location of the elements relative to the headband and to the users eyes.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
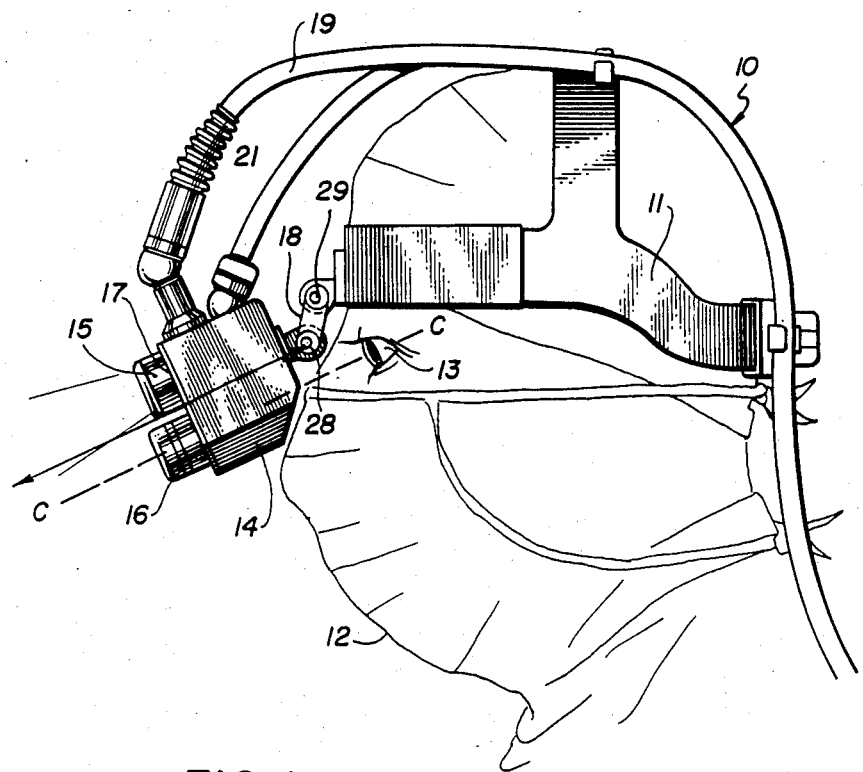
FIG. 1 is a side elevational view of the headlight embodying the principles of the present invention.
Figure 2:
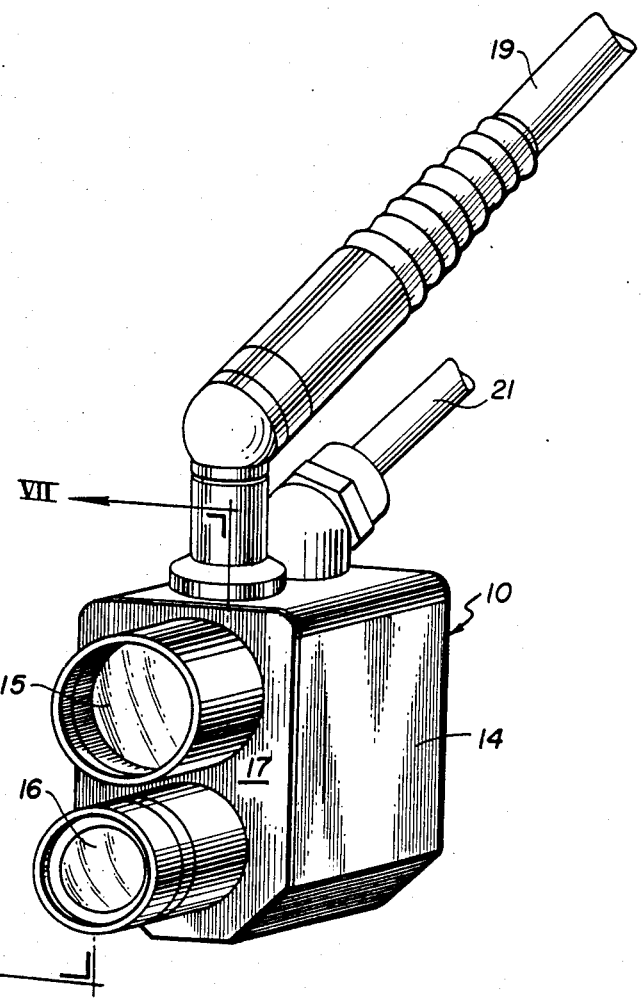
FIG. 2 is a perspective view of a portion of the headlight.
Figure 6:
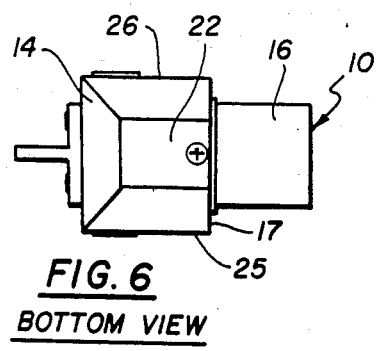
FIG. 6 is a bottom plan view of the headlight.
Figure 3:
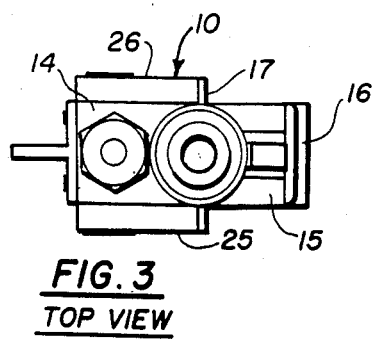
FIG. 3 is a plan view of the headlight.
Figure 8:
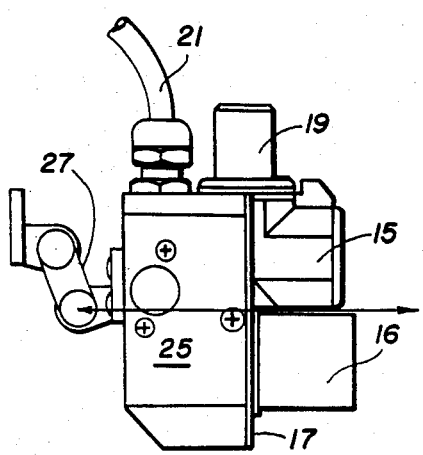
FIG. 8 is a right hand side view of the invention.
Figure 7:
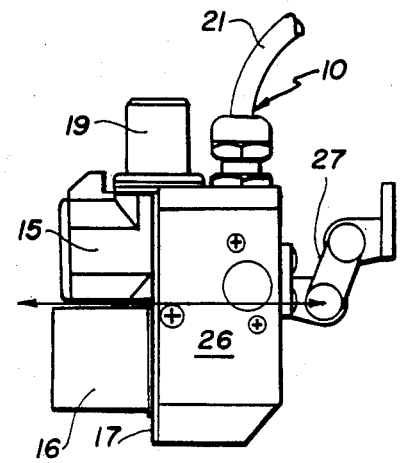
FIG. 7 is a left hand side elevational view of the invention.
Figure 4:
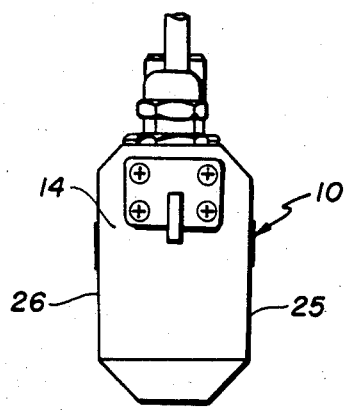
FIG. 4 is a rear elevation view of the headlight.

Referring first to FIG. 1, which best shows the general features of the invention, the headlight, indicated generally by the reference numeral 10, is shown as having a headband 11 mounted on the head 12 of a user, such as a surgeon, whose eyes are indicated by the reference numeral 13. Mounted on the headband is a main housing 14 having a surface or face 17 directed toward the operating area. From the face 17 extends an illuminating lense 15 and a viewing lense 16. The centerline A—A of the lense 17 and the centerline C—C of the lense 16 lie in a vertical plane midway between the user's eyes 13. They intersect at a substantial distance from the face 17. A bracket 18 holds the housing 14 on the level with the eyes 13 of the user and lies midway between the eyes. The bracket permits the adjustment of the housing 14 relative to the headband 11 and the eyes. The adjustment permitted is of distance, level, and angle in the said vertical plane.

The light source fibre-optic cable 19 extends from the top of the housing 14 and is connected to the illuminating lense 15. A communication cable 21 also extends from the top of the housing 14 to transmit an image to a viewing screen (not shown) that is substantially the same as the image seen by the eyes 13.

As is evident in FIGS. 2 to 8, the housing 14 is a right parallelepiped and the face 17 is a narrow rectangular shape whose width is such that the eyes 13 can observe the work area on either side of the unit without interference by the housing or lense.

Figure 9:
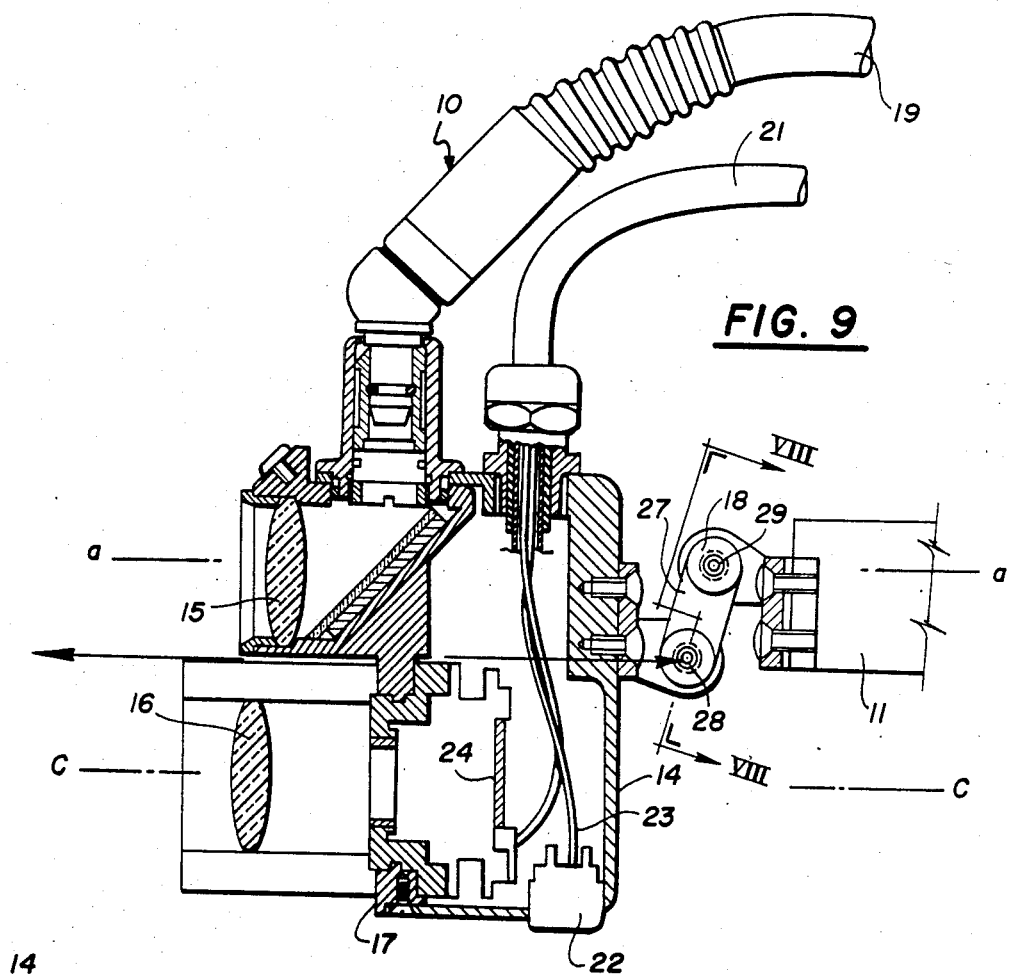
FIG. 9 is a vertical sectional view of the headlight taken on the line VII—VII of FIG. 2.

Referring to FIG. 9, it can be seen that a microphone 22 is mounted in the bottom of the housing 14 and is provided with a cable 23 leading into the communication cable 21 and is connected eventually to an amplifier, a loudspeaker, and a recorder at a remote location.

The illuminating lense 15 forms part of a system shown and described in the Kloots U.S. Pat. No. 4,516,190 which issued on May 7, 1985. As such, the lense 15 receives light from a mirror after the light arrives in a fibre-optic cable 19 from a light source that is well known in the art. The light beam that leaves the lense 15 has a large diameter and, since its centerline A—A is at a slight angle to the centerline C—C of the viewing lense 16, the viewing lense will pick up an illuminated area over a wide range of distances from the face 17 of the housing. The viewing lense is interchangeable with a set of lenses of different focal length to permit viewing over various distances. The centerline of the viewing lense C—C is between the eyes 13 of the user and on a level therewith, so that the image picked up is exactly the same as the image seen by the eyes.

A transducer in the form of an integrated circuit chip 24 is located in the housing behind the viewing lense 16 that acts as a light-to-electrical transducer, the electrical signal being carried back into the communication cable 21. The chip 24 is of the well-known type in which light images which strike the surfaces of the chip are converted to electrical signals that can be removed by an electrical cable and placed on a CRT screen at a remote location. In the preferred embodiment, the chip 24 is made by SONY and identified by them is their Type 1CX016K. The chip has 384 horizontal picture elements and 491 vertical picture elements with a sensing area of 8.8 mm. by 6.6 mm. Its horizontal drive frequency is 7.16 mega Hz (2 Fsc) and a vertical drive frequency of 15.75 KHz. Its structure is that of an interline transfer charge couple device and the cell size is 23.0 micrometers (horizontal) by 13.4 micro-meters (vertical). This chip can be used in either the NTSC, PAL, PAL-M, or the SECAN system.

Figure 10:
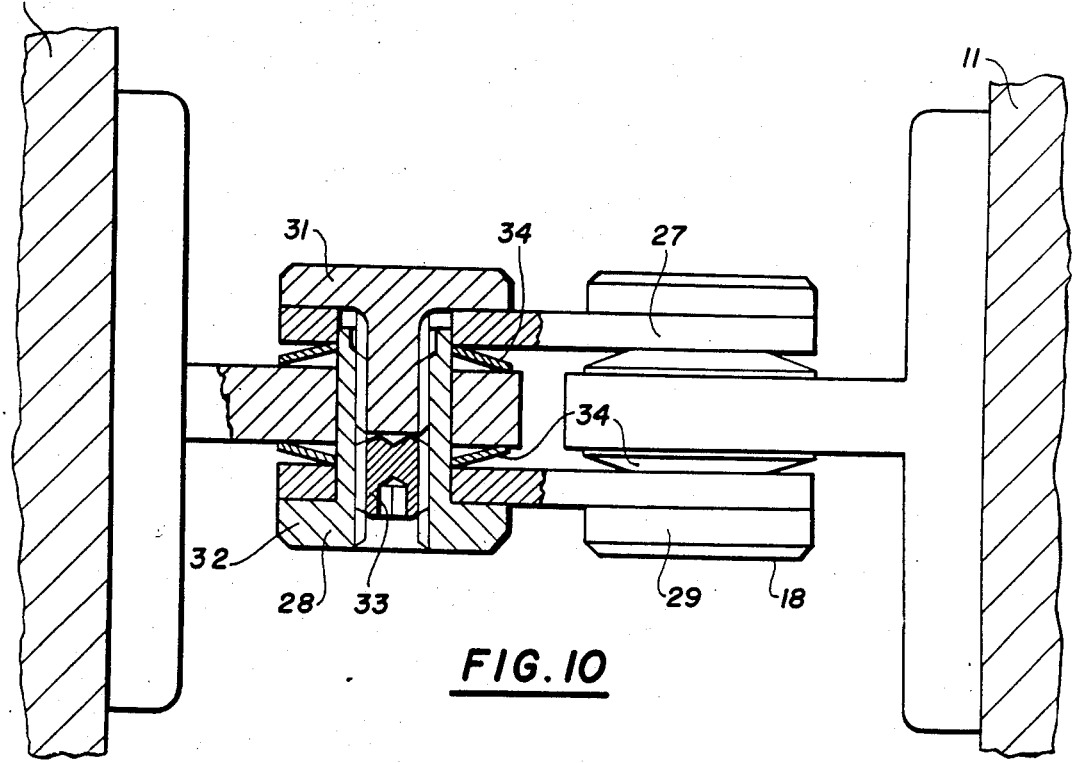
FIG. 10 is a partially-sectioned view of a part of the apparatus taken on the line VIII—VIII of FIG. 7.

Referring particularly to FIGS. 9 and 10, it can be seen that the bracket 18 is provided with a link 27 that is attached by a pivot 28 with the rear of the main housing 18 to provide a first horizontal pivotal axis that is midway between the centerlines of the two lenses 15 and 16. The link is attached at the other end by a pivot 29 to the headband 11 to provide a second horizontal pivotal axis that is on the level above the first pivotal axis. In this way, angular adjustment can take place with a minimum of change in vertical and horizontal location of the lenses relative to the headband and the users eyes 13. Suitable means is provided in the pivots 28 and 29 to adjust the friction, so that the adjustments take place readily and still maintain location during activity of the user.

Figure 5:
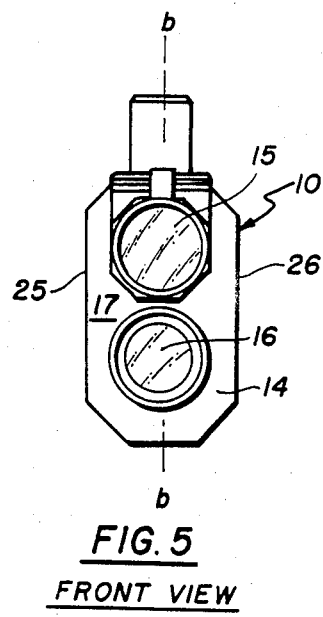
FIG. 5 is a front elevational view of the headlight.

As is particularly evident in FIG. 5, the housing 14 is provided with spaced parallel sides 25 and 26 which define the surface 17. The distance between the sides is less than the distance between the users eyes 13, and the lenses 15 and 16 are small enough to be entirely encompassed between the sides, so that neither housing nor lenses interfere with the users line-of-sight.

The operation and advantages of the present invention will now be readily understood in view of the above description. The apparatus is provided with external remote equipment which generates a twin beam F.O. halogen light passing through the cable 19. Furthermore, the microphone 22 is connected by its cable 23 to suitable audio amplifying equipment which in turn is connected either to loudspeakers or to recording equipment to record sound during the operation. The video lense 16 is located to project an image onto the chip 24 which is connected by electrical cable to suitable amplifying and raster equipment to provide for reproducing the image on a cathode ray tube screen in the well-known manner. Initially, the headband 11 is placed on the head 12 of the surgeon and he then adjusts the position of the housing 14 by moving it about the pivots 28 and 29 associated with the bracket 18. Because of the way that the pivots 28 and 29 are constructed, suitable friction is provided, this being associated with the fact that the halves of the pivot are screwed together in the presence of Belleville springs to adjust the friction. The pivot 28, for instance, consists of two halves 31 and 32 which are screwed together and are locked by a set screw 33. Belleville springs 34 are suitably located between the heads of the halves 31 and 32 to press against the link 27 and allow for adjustment of friction in the pivot. A certain amount of adjustment of this friction is desirable before the apparatus is to be used in the operating room. The light beam emitted by the illuminating lense 15 is projected downwardly against the work area where the operation is taking place. The surgeon's eyes 13 lie substantial distances on either side of the sides 25 and 26 of the housing 14 so he is able to observe the work area without it blocking his view. The centerline C—C of the viewing lense 16 always intersects the viewing area and moves with the beam from the lense 15, despite any adjustments relative to the headband 11 and despite any movement of the surgeon's head as he works. This means that the image picked up by the viewing lense 16 (and carried back to the chip 24) is exactly the same image observed by the surgeon as he works. This means that, ultimately, any observer of the CRT screen will see exactly what the surgeon sees. Furthermore, if a recording is made of the proceedings, the recording shows exactly what the surgeon sees and does. This, combined with the fact that the surgeon will be describing the operation verbally for the receipt by the microphone 22, makes for a complete educational demonstration of the surgical operation, as well as the possibility of making a complete record of it for use (for instance) in a malpractice suit.

It can be seen that the present invention has a number of decided advantages over the equipment of the prior art. First of all, the use of an audio pickup microphone 22 at the bottom of the housing 14 means that it is readily available for the surgeon to describe his procedures. The use of the integrated circuit chip 24 provides for an image of great clarity and discrimination to be carried back to the educational demonstration unit or to the recording equipment. The fact that the centerline of the viewing lense 16 is directly in line with the lines extending from the eyes 13 of the surgeon to the work area, means that the image is exactly the same as that observed by the surgeon. When he moves his head or moves the housing 14 (to have the beam from the illuminating lense 15 fall on the area in which he is working), he is automatically causing the viewing lense to observe what his eye sees. This overcomes the problem of the prior art where T.V. cameras or the like were located to one side of the surgeons head and the operators are underfoot. It was impossible, of course, to shoot the T.V. camera line-of-sight through the surgeon's head and, therefore, in many instances a true picture of the procedure could not be picked up. The use of the integrated circuit chip for transmitting the image overcomes the problem that the fibre-optic transmission had in the past of giving a weak signal with poor resolution. The present apparatus, therefore, makes it possible to enjoy a coaxial line-of-vision mode in the instruction of students and the recording of operations (similar to surgical procedures). This is particularly important where the user is operating in a deep narrow cavity or close to the operation, such as in a interocculor lense insertion in the eye. One of the attributes of the apparatus that makes these advantages possible is the use of small lenses mounted in the housing 14, so that there is no blocking of the surgeon's view, even in the case of persons whose interocculator distance is small.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Headlight, comprising:
   (a) a headband adapted to fit snugly on a human head above the eyes,
   (b) a main housing having an illuminating lense system and a viewing lense fixedly mounted in and extending from one face of the main housing, the centerlines of the lenses lying in a vertical plane midway between the user's eyes and intersecting at a substantial distance from the said face,
   (c) a bracket holding the housing on a level with the eyes of the user and midway between the eyes, the bracket permitting adjustment of the housing relative to the eyes, the adjustment permitted being of distance, level, and angle in the said vertical plane,
   (d) a light source fibre-optic cable extending from the top of the housing and connected to the illuminating lense system to provide it will light,
   (e) a light-signal to electrical-signal transducer located in the housing behind the viewing lense, and
   (f) a communication cable connected to the tranducer and extending from the top of the housing to transmit an image from the transducer to a viewing screen that is substantially the same as the image seen by the eyes.

2. Headlight as recited in claim 1, wherein a microphone is mounted on a lower portion of the housing, and a cable extends from the microphone into the communications cable.

3. Headlight as recited in claim 1, wherein the illuminating lense system rceives light from the fibre-optic cable and generates a light beam of sufficient diameter that the focal point of the viewing lense lies within the beam over a wide range of working distances from the housing face.

4. Headight as recited in claim 1, wherein the centerline of the viewing lense is located midway between the eyes of the user and on a level therewith, so that the image picked up is exactly the same of the image seen by the eyes.

5. Headlight as recited in claim 1, wherein the transducer is in the form of an integrated circuit chip.

6. Headlight as recited in claim 1, wherein the housing is provided with spaced, parallel sides defining the said face, the distance between the sides being less than the distance between the user's eyes, and wherein the lenses are entirely enclosed between the sides, so that neither housing nor lenses interferes with the user's line-of-sight.

7. Headlight as recited in claim 1, wherein the bracket consists of a link that is attached by a pivot to the rear of the main housing to provide a first horizontal pivotal axis that is midway between the centerlines of the two lenses and that is attached by a pivot to the headband to provide a second pivotal axis that is on a level above the said first pivotal axis, so that angular adjustment can take place with a minimum change in vertical and horizontal positioning relative to the headband and the user's eyes.

8. Headlight, comprising:
   (a) a headband, adapted to fit snugly on a human head above the eyes,
   (b) a main housing having an illuminating lense system and a viewing lense fixedly mounted in and extending from a narrow face of the main housing, the viewing lense including integrated circuit chip acting as a light-to-electrical signal transducer, the centerlines of the lenses lying in a vertical plane midway between the user's eyes and intersecting at a substantial distance from the said face,
   (c) a bracket holding the housing in the general level of the eyes of the user and midway between the eyes, the bracket permitting adjustment of the housing relative to the eyes, the said adjustment being of distance, level, and angle in the said vertical plane, (d) a light source fibre-optic cable extending from the top of the housing and connected to the illuminating lens system to provide it with light, (e) a communication cable connected to the integrated circuit chip and also extending from the top of the housing to transmit an image from the chip to a viewing screen, which image is substantially the same as the image seen by the eyes, and (f) a microphone mounted in the lower part of the housing for receiving voice material for transmission to a remote location.

* * * * *